(12) United States Patent
Naniwa et al.

(10) Patent No.: US 9,966,093 B1
(45) Date of Patent: May 8, 2018

(54) HEAT ASSISTED MAGNETIC RECORDING HEAD GIMBAL ASSEMBLY AND HARD DISK DRIVE USING SAME

(71) Applicant: Western Digital Technologies, Inc., Irvine, CA (US)

(72) Inventors: Irizo Naniwa, Fujisawa (JP); Shigeo Nakamura, Odawara (JP); Tomoaki Uno, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days. days.

(21) Appl. No.: 15/393,011

(22) Filed: Dec. 28, 2016

(51) Int. Cl.
*G11B 5/60* (2006.01)
*G11B 5/48* (2006.01)
*G11B 5/00* (2006.01)

(52) U.S. Cl.
CPC ............ *G11B 5/4826* (2013.01); *G11B 5/486* (2013.01); *G11B 5/4833* (2013.01); *G11B 2005/0021* (2013.01)

(58) Field of Classification Search
None
See application file for complete search history.

(56) References Cited

U.S. PATENT DOCUMENTS

| 8,179,745 | B2 | 5/2012 | Nakamura et al. | |
|---|---|---|---|---|
| 8,243,561 | B2 | 8/2012 | Matsumoto | |
| 8,411,535 | B1 * | 4/2013 | Hirano | G11B 5/105 369/13.32 |
| 8,611,050 | B1 * | 12/2013 | Moravec | G11B 5/4826 360/234.5 |
| 8,837,261 | B1 * | 9/2014 | Murata | G11B 5/4866 360/264.2 |
| 8,848,318 | B2 | 9/2014 | Tsuchiyama et al. | |
| 8,923,099 | B2 | 12/2014 | Naniwa et al. | |
| 8,982,923 | B2 * | 3/2015 | Cole | G11B 5/105 372/108 |
| 9,013,967 | B1 | 4/2015 | Nakamura et al. | |
| 9,025,423 | B1 | 5/2015 | Naniwa et al. | |
| 9,153,275 | B1 | 10/2015 | Naniwa et al. | |
| 9,245,553 | B2 | 1/2016 | Boone, Jr. et al. | |
| 9,257,138 | B1 * | 2/2016 | Ouyang | G11B 5/4826 |

(Continued)

FOREIGN PATENT DOCUMENTS

| DE | 102015008063 A1 | 1/2016 |
|---|---|---|
| JP | 2012018747 A | 1/2012 |
| JP | 2015103273 A | 6/2015 |

*Primary Examiner* — William J Klimowicz

(57) ABSTRACT

A heat assisted magnetic recording head gimbal assembly comprises a light source unit, a heat assisted magnetic recording head, a suspension, an actuator, and a slider. The light source unit comprises a light emitting element and a submount. The suspension comprises a load beam and a flexure movably coupled with the load beam. The actuator is deformably coupled to the flexure. The slider is supported by the suspension and coupled to the flexure and the light source unit. The slider includes the heat assisted magnetic recording head. First and second solders or conductive adhesives are positioned on opposite longitudinal sides of the light source unit, so that the first solder or conductive adhesive electrically and mechanically connects the submount to a wiring supplying power, while the second solder or conductive adhesive electrically and mechanically connects the light emitting element to the wiring.

14 Claims, 5 Drawing Sheets

(56) References Cited

U.S. PATENT DOCUMENTS

| | | | |
|---|---|---|---|
| 9,368,139 B1 | 6/2016 | Sedklang et al. | |
| 9,437,227 B1 * | 9/2016 | Honda | G11B 5/4826 |
| 9,558,775 B2 * | 1/2017 | Jandric | G11B 5/314 |
| 9,614,350 B2 * | 4/2017 | Tani | H01S 5/028 |
| 9,754,617 B2 * | 9/2017 | Cheng | G11B 5/6088 |
| 2012/0147717 A1 | 6/2012 | Shimazawa et al. | |
| 2013/0133182 A1 * | 5/2013 | Bonhote | G11B 5/105 |
| | | | 29/603.03 |
| 2014/0098652 A1 | 4/2014 | Tomiyama et al. | |
| 2014/0269236 A1 * | 9/2014 | Kozlovsky | G11B 5/314 |
| | | | 369/13.24 |
| 2015/0146507 A1 * | 5/2015 | Boone, Jr. | G11B 5/4866 |
| | | | 369/13.32 |
| 2015/0154988 A1 * | 6/2015 | Takei | G11B 5/6088 |
| | | | 369/13.14 |
| 2015/0348579 A1 | 12/2015 | Naradate et al. | |
| 2016/0247527 A1 * | 8/2016 | Cheng | G11B 5/105 |

\* cited by examiner

HEAT ASSISTED MAGNETIC RECORDING HEAD GIMBAL ASSEMBLY AND HARD DISK DRIVE USING SAME

BACKGROUND

The present disclosure relates to a heat assisted magnetic recording head gimbal assembly that comprises a heat assisted magnetic recording head executing heat assisted magnetic recording, which is one of the techniques to improve areal density of hard disk drives drastically, and a suspension of the head, and further relates to a hard disk drive using the head gimbal assembly.

In recent years, heat assisted magnetic recording has been developed to significantly improve the areal density of hard disk drives. One promising development is the incorporation of second-generation actuators into the head gimbal assembly for increased head positioning accuracy, which delivers better performance, data integrity, and overall drive reliability. Compared to first-generation actuators, the second-generation actuators have a lighter mass with a correspondingly vibrational resonance frequency, which allows a more rapid and accurate head positioning. One proposed approach is to couple a second-generation actuator to the suspension of the head gimbal assembly.

However, simply incorporating second-generation actuators into existing head gimbal assemblies using conventional approaches would lead to a deterioration in the performance of the heat assisted magnetic recording head. For example, to accommodate the actuator, the slider would require a wider landing zone at an outer area on the magnetic disk, thereby leading to a decrease in the recording area. Moreover, the performance of existing actuators is deteriorated by the larger weights of heat assisted magnetic recording heads, which may be up to 60% heavier than non-heat assisted magnetic recording heads. Thus, simply configuring existing actuators onto a conventional head gimbal assembly using conventional approaches would result in increased vibrations and reduced shock resistance, thereby deteriorating recording performance.

In addition, if an existing actuator were attached to the suspension, the motions of the actuator would limit the possible areas on the suspension where the slider can be attached, limiting them only to areas of the suspension on a trailing side of the dimple. Thus, the incorporation of the actuator would limit the possible areas of the suspension where the slider can be attached. Since a lower proportion of the total area of the suspension would be dedicated to attaching the slider, this would subsequently lead to a lower bonding strength between the slider and the suspension, which would reduce the operational reliability of the head gimbal assembly.

SUMMARY

To address the above described challenges, a heat assisted magnetic recording head gimbal assembly is provided. The head gimbal assembly comprises a light source unit, a heat assisted magnetic recording head, a suspension, an actuator, and a slider. The light source unit comprises a submount mounted to a light emitting element. The suspension comprises a load beam and a flexure movably coupled to the load beam. The actuator is deformably coupled to the flexure. The slider is supported by the suspension and coupled to the flexure and the light source unit. The slider includes the heat assisted magnetic recording head. The submount and the light emitting element each have first and second longitudinal sides formed along the longitudinal direction of the assembly, and the first longitudinal side of the light emitting element is mounted to the second longitudinal side of the submount. The first longitudinal side of the submount and the second longitudinal side of the light emitting element are opposite sides of the light source unit. A first solder or conductive adhesive, mounted on the first longitudinal side of the submount, is configured to electrically and mechanically connect the submount to a wiring supplying electrical power to the light source unit. A second solder or conductive adhesive, mounted on the second longitudinal side of the light emitting element, is configured to electrically and mechanically connect the light emitting element to the wiring.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The present disclosure is illustrated by way of example and not by way of limitation in the figures of the accompanying drawings, in which the like reference numerals indicate like elements and in which.

It is to be noted that in drawings of the present application, like reference numerals denote like or corresponding portions.

DETAILED DESCRIPTION

Selected embodiments of the present disclosure will now be described with reference to the accompanying drawings. It will be apparent to those skilled in the art from this disclosure that the following description of embodiments of the disclosure is provided for illustration only and not for the purpose of limiting the invention as defined by the appended claims and their equivalents.

Figure 1:
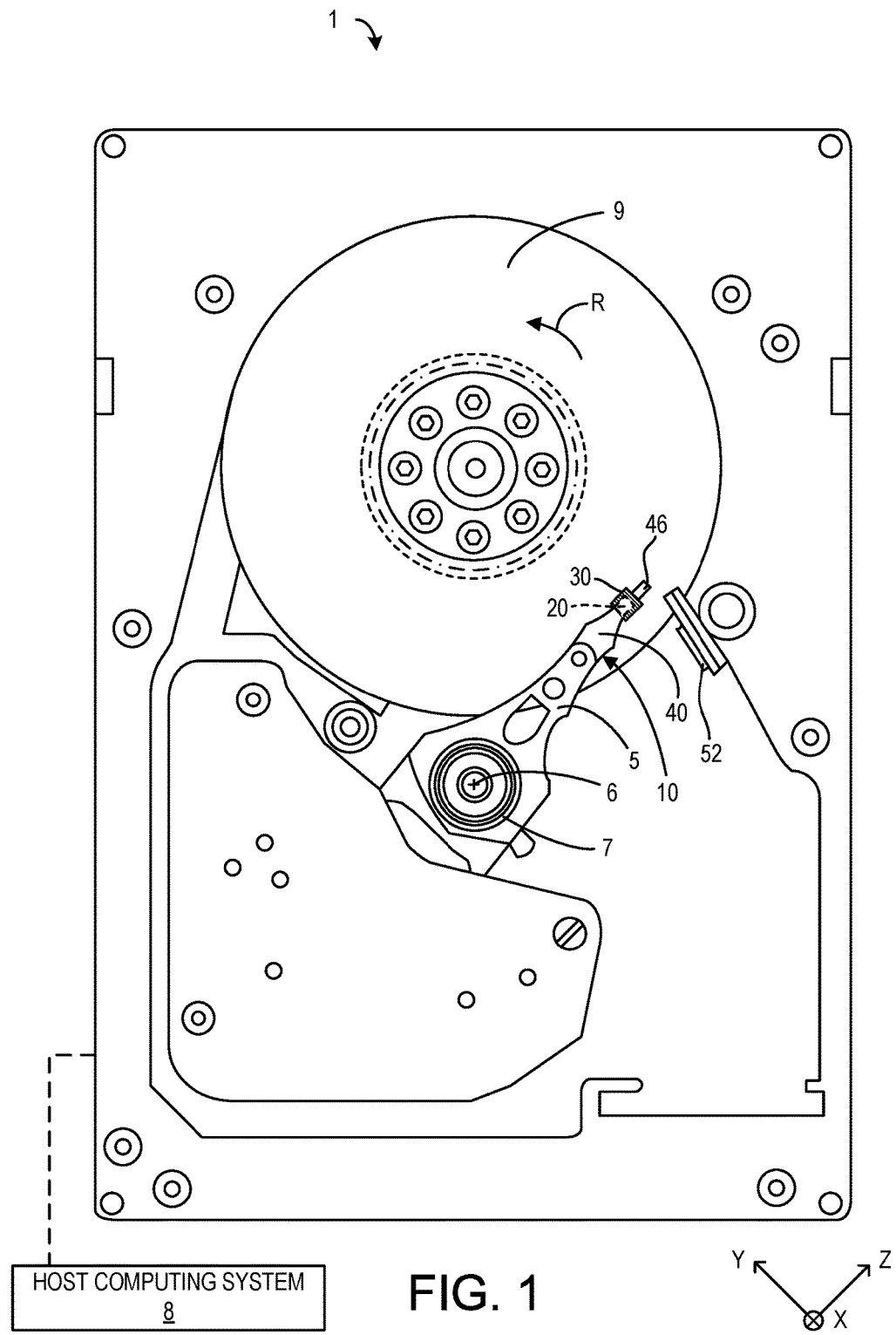
FIG. 1 illustrates an exemplary magnetic disk drive comprising a heat assisted magnetic recording head gimbal assembly, according to one disclosed embodiment.
Figure 2:
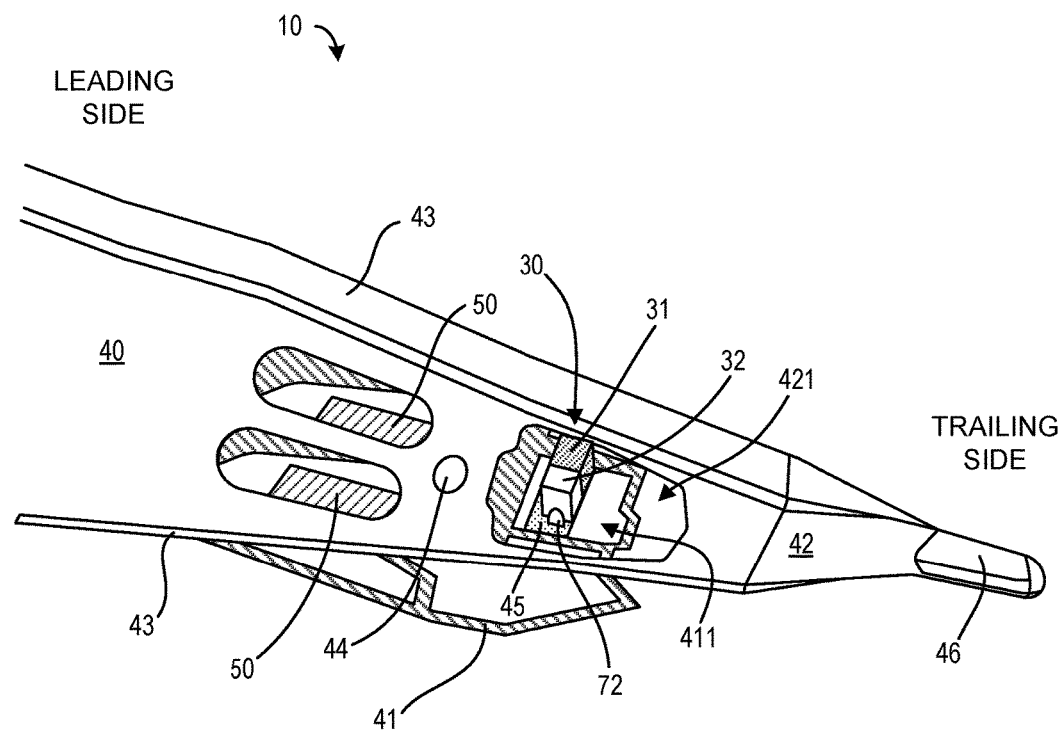
FIG. 2 is a perspective view showing on an enlarged scale the heat assisted magnetic recording head gimbal assembly according to a first embodiment of the present disclosure.

The present disclosure is directed to a heat assisted magnetic recording head gimbal assembly, an embodiment of which is shown beginning in FIG. 2, for a magnetic recording system such as a disk drive as shown in FIG. 1.

Turning initially to FIG. 1, this Figure illustrates a top view of an exemplary hard disk drive (HDD) 1, according to an embodiment of the disclosure, into which a heat assisted magnetic recording head gimbal assembly 10 of the present disclosure may be incorporated. HDD 1 is coupled to an associated host computing system 8, and is used to store information used by the computing system 8 during processing. As illustrated, HDD 1 may include one or more perpendicular magnetic recording media 9, carriage-arms 5, and suspensions 40 associated with each of the perpendicular magnetic recording media 9. The perpendicular magnetic recording media 9 may be arranged in a vertical stack, if more than one is provided. Moreover, the one or more perpendicular magnetic recording media 9 may be configured to rotate in a rotation direction R.

Perpendicular magnetic recording media 9 may include tracks of data on both the top and bottom surfaces of the disk. A heat-assisted magnetic recording head on a slider 20 may be positioned on a track. As each disk spins, data may be written on and/or read from the data track via a corresponding write head and read head of the recording head. The slider 20 is supported by a suspension 40, and the suspension 40 is supported by a carriage-arm 5. The carriage-arm 5 may be configured to rotate about a pivot 6 of a rotary actuator 7 to place the magnetic head on a particular data track. It is to be understood that the carriage-arm 5 alternatively may be configured to move in a manner other than swiveling around the pivot 6.

The suspension 40 biases the slider 20 so that the slider 20 bends towards the surface of the perpendicular magnetic recording media 9 when stationary. When the perpendicular magnetic recording media 9 rotates, air is swirled by the rotating disk adjacent to a media facing surface (MFS) of the slider 20, causing the slider 20 to ride on an air bearing a slight distance from the surface of the rotating media 9. For this reason, the MFS is also referred to as an air bearing surface (ABS). When the slider 20 rides on the air bearing, the read and write heads are employed for reading and writing magnetic transitions corresponding to host data of the host computing system 8. The read and write heads are connected to signal processing circuitry that operates according to a computer program implemented in a processor or other logic circuitry integrated within or coupled to the HDD 1 to thereby implement the reading and writing functions. A light source unit 30 is mounted on the top surface of the slider 20. The light source unit 30 may alternatively be provided on the suspension 40 and coupled to the slider 20 by an optical channel. In the Figures, the X-direction denotes a height direction perpendicular to the air-bearing surface (ABS) of the slider, the Y-direction denotes a track-width or cross-track direction, and the Z-direction denotes an along-the-track direction, down-track direction, or longitudinal direction of the head gimbal assembly 10.

In a resting position, a lift tab 46 rests in a groove in a ramp 52 under non-operating conditions to ensure that the recording head does not contact the magnetic recording media 9. During disk drive operations, the rotary actuator 7, performs a rough positioning of the magnetic recording head, moving the lift tab 46 from its resting position on the ramp 52 to a position over the magnetic recording media 9. Proper alignment between the lift tab 46 and the ramp 52 protects the head gimbal assembly 10 and the magnetic recording media 9 from structural damage as the rotary actuator 7 alternates the lift tab 46 between the resting position on the ramp 52 and recording positions over the magnetic recording media 9.

Turning to FIG. 2, a perspective view of a heat assisted magnetic recording head gimbal assembly is depicted according to a first embodiment of the present disclosure. In this view, the depiction of the slider is omitted for illustrative purposes. A heat assisted magnetic recording head gimbal assembly 10 comprises a light source unit 30 comprising a submount 31 mounted to a light emitting element 32. The suspension 40 comprises a load beam 42 and a flexure 41 movably coupled to the load beam 42. The slider (not shown) is supported by the suspension 40 and coupled to the flexure 41 and the light source unit 30. The load beam 42 comprises at least an edge flange 43, which is bent upward from the load beam 42. The edge flange 43 is formed by bending the sides of the load beam 42. The light emitting element 32 protrudes about the edge flange 43.

Wiring 45 is embedded within the flexure 41 as an integral part of the flexure 41 to electrically connect an electrical power supply to the light source unit 30, including the submount 31 and the light emitting element 32, so that the flexure 41 comprises the wiring 45. However, it will be appreciated that, in other embodiments, the wiring 45 may alternatively be formed integrally within the slider instead, so that the slider comprises the wiring 45.

An actuator 50 is deformably coupled to the flexure 41 of the suspension 40. However, in other embodiments, the actuator 50 may alternatively be deformably coupled to the load beam 42 of the suspension 40. The actuator 50 may be directly fixed to the flexure 41 or the load beam 42 by solder or conductive adhesive, or indirectly fixed to the load beam 42 or flexure 41 via one or a plurality of mounts or mounting portions. The mounts or mounting portions may be fixed to the carriage-arm 5, such that when the carriage-arm 5 rotates about a pivot 6, the magnetic head can access an arbitrary radius position on the magnetic recording media 9. The actuator 50 may comprise small, multi-layer piezoelectric elements such as PZT, which has advantages from the standpoint of rigidity and manufacturing costs. The PZT may be configured in pairs so that one piezoelectric element can expand as the other contracts. The fine positioning of the magnetic recording head 60 is performed by driving the actuator 50. A lift tab 46, which is parked into a groove of the ramp in a resting position, is provided on a tip end of the load beam 42 in the longitudinal direction (Z-direction) of the head gimbal assembly 10, nearly vertical to the central line of the load beam 42 and pointing towards the pivot 6.

Figure 3A:
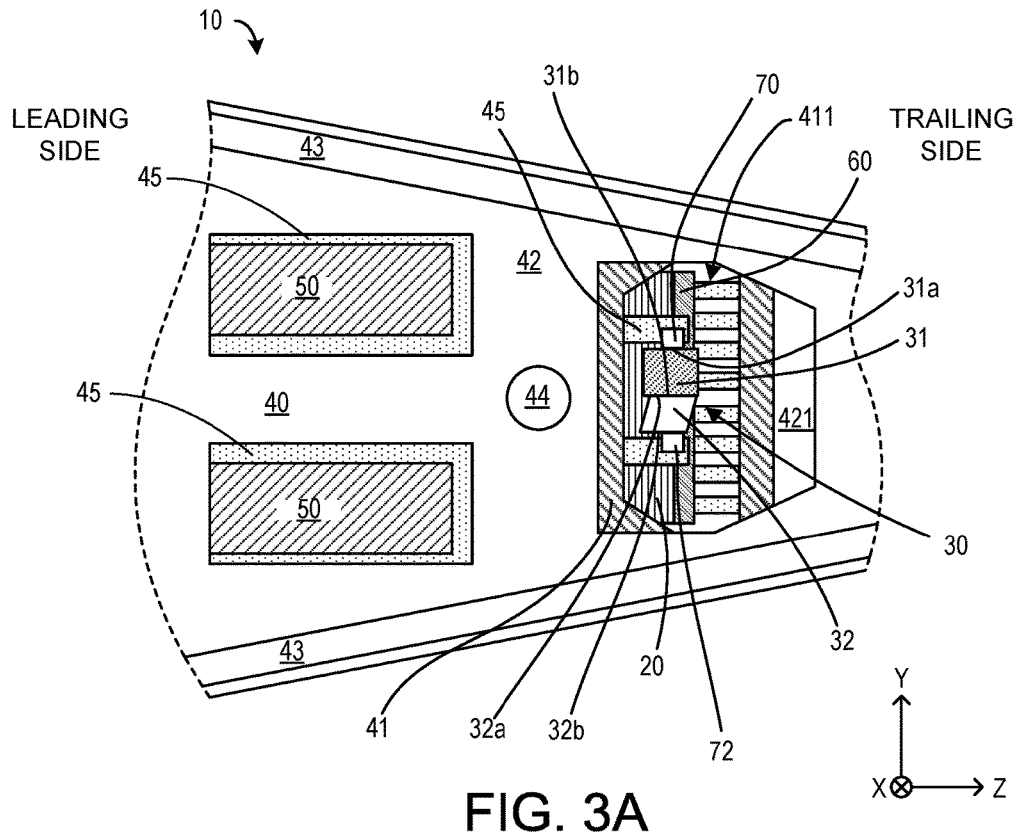
FIG. 3A illustrates a top view of a heat assisted magnetic recording head gimbal assembly according to the first embodiment of the present disclosure.
Figure 3B:
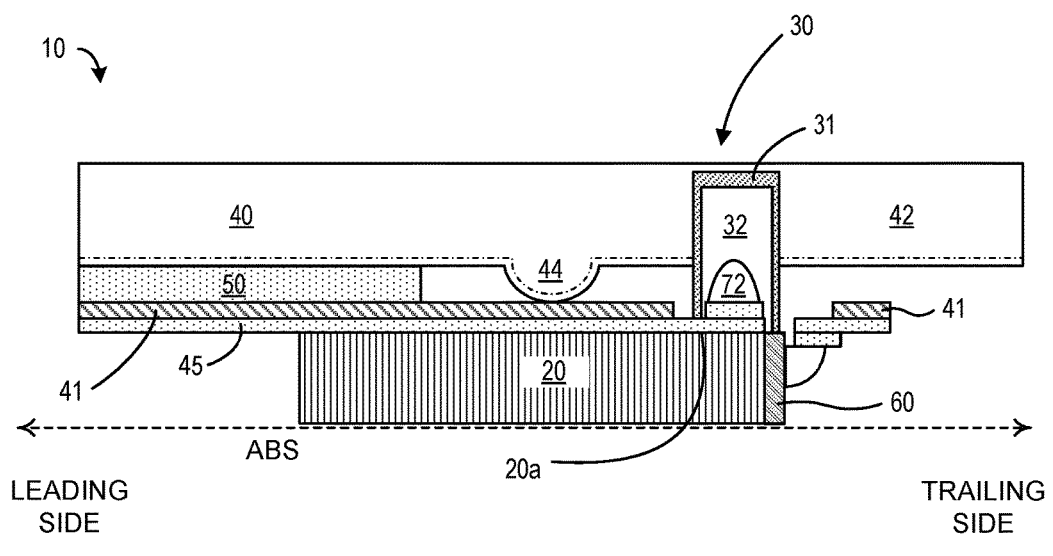
FIG. 3B illustrates a cross-sectional view of a heat assisted magnetic recording head gimbal assembly according to the first embodiment of the present disclosure.

Referring to FIGS. 3A and 3B, two views of the heat assisted magnetic recording head gimbal assembly 10 are shown according to the first embodiment of the present disclosure. FIG. 3A illustrates a top view of the gimbal assembly 10, while FIG. 3B illustrates a side view of the gimbal assembly 10. The slider 20 includes the heat-assisted magnetic recording head 60, which is formed on a substrate of the slider 20, which is coupled to the flexure 41. The heat assisted magnetic recording head 60 comprises a conventional write pole, a write coil, a wave guide, a near field transducer, and a read element (not shown). The slider 20 rides on an air bearing a slight distance from the surface of the rotating media 9, the air being swirled by the rotating media 9 adjacent to an air bearing surface (ABS) of the slider 20.

A dimple 44 is formed on the load beam 42, provided as a load acting point at which a given load pressed by the load beam 42 acts on the slider 20. The dimple 44 allows a resilience to act on movements of the slider 20 by acting as a pivot, contacting a single point on the surface of the flexure 41. In combination with the actuator 50, the dimple 44 helps enable fine positioning of the magnetic recording head 60.

The flexure window 411 is defined as a hole or aperture in the flexure 41, while the load beam window 421 is defined as a hole or aperture in the load beam 42. During manufacturing, the light source unit 30 is first mounted to the slider 20, and then the light source unit 30, which is mounted to the slider 20, is passed through the flexure window 411 and load beam window 421 until the slider 20 contacts the flexure 41. Thus, the flexure window 411 and load beam window 421 are configured in such shapes that the light source unit 30 can penetrate through the flexure window 411 and load beam window 421 without interference with the suspension 40. It will be appreciated that these windows may not be restricted to the trapezoidal shapes depicted in FIG. 3A, and they can be, for example, notches or rectangles that approximate the footprint of the light source unit 30. In general, smaller sizes of the flexure window 411 and load beam window 421 are associated with increased structural strengths of the lift tab 46, while larger sizes of the windows are associated with weaker lift tabs 46 that are more prone to bending and deformation that result in misalignment between the lift tab 46 and the ramp 52, and subsequent damage to the magnetic recording head 60 and the magnetic recording media 9.

The submount 31 is bonded to a flexure bonding surface 20a of the 20 slider. The submount 31 has a first longitudinal side 31a and a second longitudinal side 31b, while the light emitting element 32 likewise has a first longitudinal side 32a and a second longitudinal side 32b, so that the first longitudinal side 31a of the submount 31 and the second longitudinal side 32b of the light emitting element 32 are opposite sides of the light source unit 30. The longitudinal sides are formed along the longitudinal direction (Z-direction) of the head gimbal assembly 10. To enhance conductivity, the first longitudinal side 31a, a second longitudinal side 31b, and/or a top surface of the submount 31 may be covered with metallic films, as described below. The submount 31 may comprise a conductive material, such as aluminum nitride or a crystalline silicon material, for example.

A first solder or conductive adhesive 70, mounted on the first longitudinal side 31a of the submount 31, is configured to electrically and mechanically connect the submount 31 to a wiring 45 of the flexure 41 of the suspension 40. In turn, a second solder or conductive adhesive 72, mounted on the second longitudinal side 32b of the light emitting element 32, is configured to electrically and mechanically connect the light emitting element 32 to the wiring 45 of the flexure 41 of the suspension. In other words, the first and second solders or conductive adhesives 70 and 72 are positioned on opposite longitudinal sides of the light source unit 30. The solders or conductive adhesives may comprise electrically conductive connections and wirings, including gold, platinum, and other electrically conductive metals, for example. In other embodiments, it will be appreciated that the first solder or conductive adhesive 70 and the second solder or conductive adhesive 72 may alternatively be electrically and mechanically connected to a wiring of the slider 20 instead of the flexure 41. Although solders and conductive adhesives are described interchangeably in the present disclosure, it will be noted that solders have had more practical application in recent embodiments of the head gimbal assembly 10. Nonetheless, it will be appreciated that these solders can be replaced with conductive adhesives in these embodiments as well.

Figure 4:
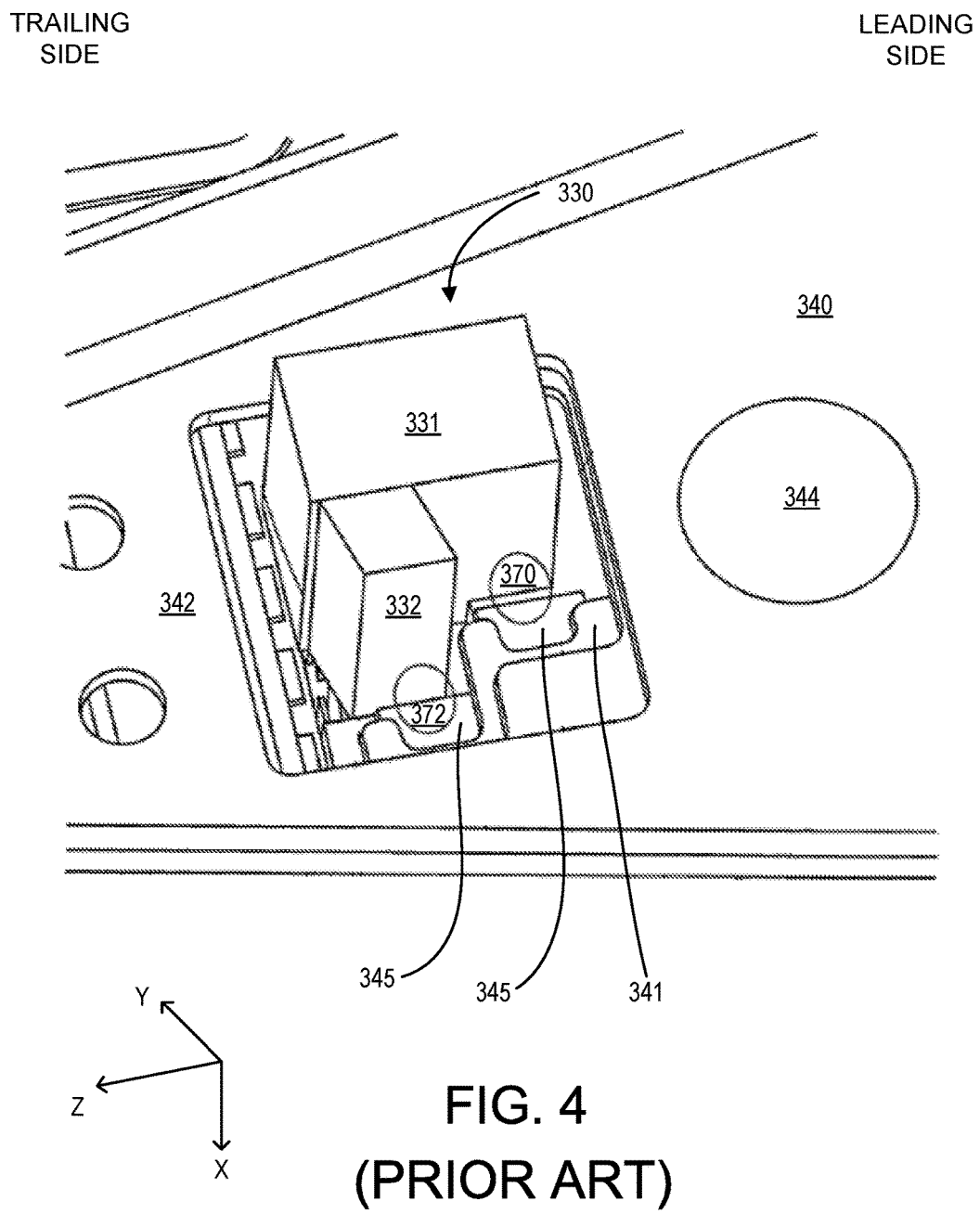
FIG. 4 illustrates a perspective view showing on an enlarged scale a conventional light source unit of a conventional heat assisted magnetic recording head gimbal assembly.

In contrast, in conventional head gimbal assemblies, the first and second conductive adhesives (alternatively, the first and second solders) are positioned on the same longitudinal side of the light source unit, as depicted in FIG. 4, which shows an enlarged view of a conventional light source unit 330 comprising a conventional light emitting element 332 and a conventional submount 331. In this conventional embodiment, the first solder or conductive adhesive 370 and second solder or conductive adhesive 372 are positioned on the same longitudinal side of the light source unit 330. It will be appreciated that the longitudinal dimension of the submount 331 is twice that of the first embodiment, so that conventional light source unit 330 forms an 'L' shape in the perspective view, unlike the rectangular shape of the light source unit 30 of the first embodiment. In the conventional art, it was understood that rearranging the positioning of the conductive adhesives or solders would add to manufacturing costs, since the manufacturing method would require yet another direction in which to add a conductive adhesive to the head gimbal assembly, necessitating extra manufacturing steps that reposition the substrate in various orientations by flipping the assembly, for example. It was also widely assumed that any modification that reduced the footprint of the submount on the slider would lead to reduced bonding strength between the light source unit and the slider, which would destabilize the handling of the light source unit and subsequently compromise shock resistance and recording performance. It was also widely thought that reducing the longitudinal dimension of the submount would decrease heat dissipation, thereby overheating the light source unit.

Despite these challenges and conventional assumptions, the present inventor discovered several potential advantages of the present invention over conventional head gimbal assemblies. Since the longitudinal dimension of the submount can be roughly halved compared to the prior art, the flexure window 411 and load beam window 421 can be consequently be configured smaller than in the conventional head gimbal assemblies. During experimentation, the present inventor has found that the longitudinal dimension of the flexure window 411 can be reduced by as much as 33%, and that of the load beam window 421 by as much as 25%. As discussed above, shrinking the flexure window 411 and load beam window 421 generally improves the structural strength of the lift tab 46, thereby reducing the risk of any unwanted bending and deformations during disk drive operations, avoiding any subsequent misalignments between the ramp 52 and the lift tab 46 when the lift tab 46 is parked into the ramp 52 in a resting position, so that structural damage to the magnetic recording media 9 and/or the head gimbal assembly 10 can be prevented. Moreover, a smaller flexure window 411 can also ensure a wider slider attachment area at the flexure 41. This can increase the bonding strength between the slider and the suspension to improve the reliability of recording operations.

Further, the balanced spatial configuration of the two solders or adhesives on the light source unit allows the submount to be repositioned closer to the center of gravity of the combined light source unit and solders or conductive adhesives, thereby reducing mechanical imbalance. This achieves the potential advantage of ensuring the mechanical stability of the slider even when an external shock is applied.

In addition, a smaller submount that does not compromise the bonding strength between the slider and the suspension leads to a reduction in the weight of the light source unit, which reduces shock and enhances vibration resistance when the head gimbal assembly is coupled to an actuator, further enhancing recording performance. A smaller and lighter light source unit can also allow for a slider that is shorter in the longitudinal direction by as much as 32% relative to conventional sliders, which would obviate the need for a wider landing zone at an outer area of the magnetic disk, thereby preventing a decrease in the recording area. The present inventor has also unexpectedly discovered that heat dissipation is not compromised by shrinking the submount, finding that heat still readily dissipates from the light source unit, away from the air bearing surface of the slider into the magnetic recording media which readily absorbs the heat.

Figure 5:
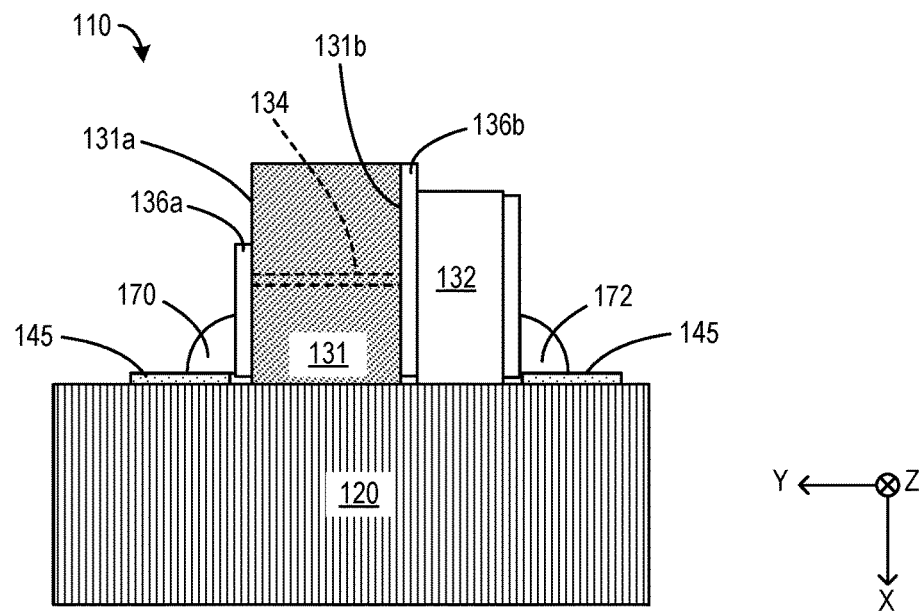
FIG. 5 illustrates a cross-sectional view depicting a heat assisted magnetic recording head gimbal assembly according to a second embodiment of the present disclosure.

Turning to FIG. 5, a cross-sectional view of a light source unit 130 of a heat assisted magnetic recording head gimbal assembly is shown according to the second embodiment of the present disclosure. Since the head gimbal assembly 110 of the second embodiment is generally similar to that of the first embodiment with the exception of at least one through-hole configured in the submount 131 and the metallic films that are overlaid on at least the longitudinal sides of the submount 131, the detailed description thereof is abbreviated here for the sake of brevity. It is to be noted that like parts are designated by like reference numerals throughout the detailed description and the accompanying drawings. In this embodiment, high performance electrical connections, such as through-silicon vias, may be further applied to a submount 131 comprising a crystalline silicon material, which may include silicon doped with impurity atoms, in the configuration of the first solder or conductive adhesive 170 and second solder or conductive adhesive 172 on opposite longitudinal sides of the light source unit 130. To enhance conductivity, first metallic film 136a may be provided on a first longitudinal side 131a of the submount 131, so that the first metallic film 136a interposes between the submount 131 and the first solder or conductive adhesive 170. Further, a second metallic film 136b may be provided on a second longitudinal side 131b of the submount 131, so that the second metallic film 136b interposes between the submount 131 and the light emitting element 132. It will be appreciated that other metallic films may also be provided, such as metallic film interposed between the light emitting element 132 and the second solder or conductive adhesive 172. At least one through-hole 134 may be mechanically or chemically etched to electrically communicate the first metallic film 136a on the first longitudinal side 131a of the submount 131 with the second metallic film 136b on the second longitudinal side 131b of the submount 131. It will be appreciated that the internal surfaces of the through-hole 134 within the submount 131 may also be coated with a metallic film to improve conductivity. Although the through-hole 134 is depicted to penetrate the submount 131 in parallel with the air bearing surface of the slider 120, it will be appreciated that the through-hole 134 may alternatively be configured in a diagonal configuration relative to the air bearing surface of the slider 120. The metallic films may comprise gold, platinum, and other electrically conductive materials that are appropriate for through-silicon vias.

Figure 6:
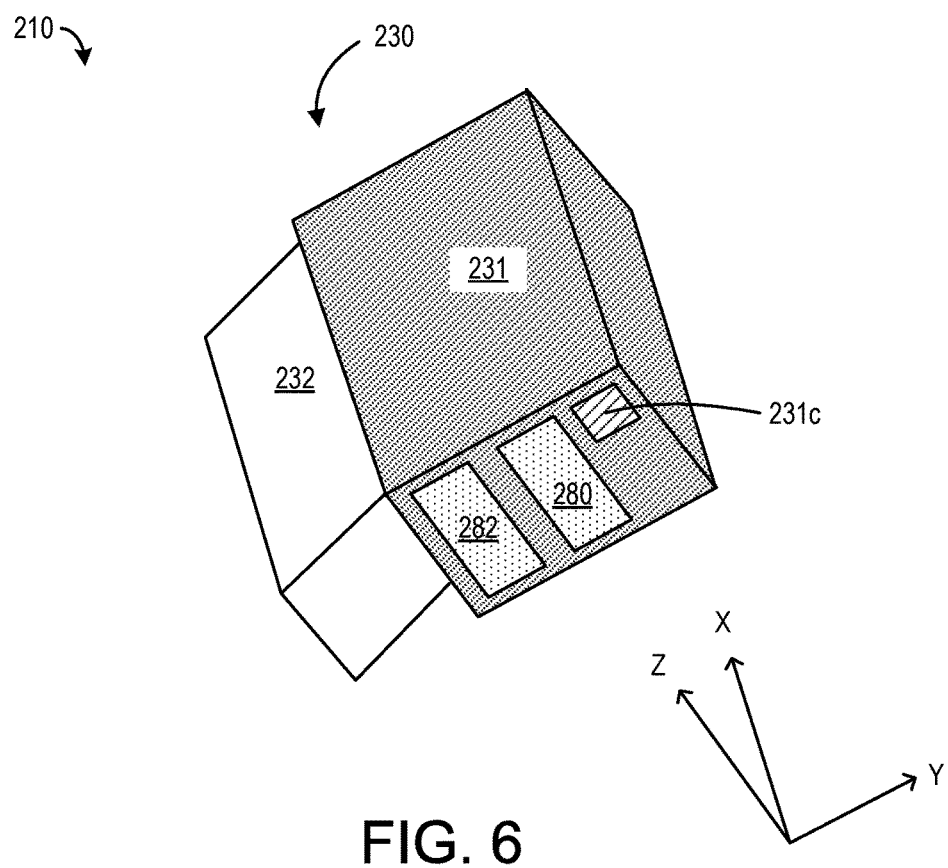
FIG. 6 illustrates perspective view of a light source unit of a heat assisted magnetic recording head gimbal assembly according to a third embodiment of the present disclosure.

Turning to FIG. 6, a perspective view of a light source unit 230 of a heat assisted magnetic recording head gimbal assembly is shown according to the third embodiment of the present disclosure. In this view, the light source unit 230 is depicted in isolation for illustrative purposes. Since the head gimbal assembly 210 of the third embodiment is generally similar to that of the first embodiment with the exception of the presence of the integrally formed photodetector 231c in the submount 231, the detailed description thereof is abbreviated here for the sake of brevity. In the third embodiment, a photodetector 231c is integrally formed with the submount 231, on an air bearing surface side of the submount 231, thereby obviating the need for additional space for the photodetector 231c on the magnetic head, so as to minimize any increase in the mass of the magnetic head. Electrodes 280 and 282 may also be provided on the air bearing surface side of the submount 231 to provide electrical power supply to the photodetector 231c. The photodetector 231c may be a semiconductor photodiode that is configured to receive optical energy from the light emitting element 232 by way of a waveguide that is integrally formed with the slider and configured to guide optical energy from the light emitting element 232 through the slider to the photodetector 231c. Accordingly, a single device is provided that operates a mechanical support for the light emitting element as well as providing for monitoring the feedback of the optical power through the photonic integrated circuit of the heat assisted magnetic recording head heating assembly.

According to the present disclosure as described above, embodiments of a heat assisted magnetic recording head gimbal assembly are provided to improve mechanical balance and reduce the weight and dimensions of the light emitting unit when an actuator is incorporated into a heat assisted magnetic recording head gimbal assembly, while strengthening the lift tab to avoid misalignments between the lift tab and the ramp, as well as minimizing any decrease in the recording area. As a result, vibrations are reduced, shock resistance is increased, and recording performance and reliability are improved for the magnetic recording head in the head gimbal assembly.

It will be understood that the configurations and/or approaches described herein are exemplary in nature, and that these specific embodiments or examples are not to be considered in a limiting sense, because numerous variations are possible. The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A heat assisted magnetic recording head gimbal assembly comprising:
   a light source unit comprising a submount mounted to a light emitting element;
   a suspension comprising a load beam and a flexure movably coupled to the load beam;
   an actuator deformably coupled to the flexure; and
   a slider supported by the suspension and coupled to the flexure and the light source unit, the slider including a heat assisted magnetic recording head; wherein:
   the submount and the light emitting element each have first and second longitudinal sides formed along a longitudinal direction of the assembly, wherein the first longitudinal side of the light emitting element is mounted to the second longitudinal side of the submount;
   the first longitudinal side of the submount and the second longitudinal side of the light emitting element are opposite sides of the light source unit;
   a first solder or conductive adhesive, mounted on the first longitudinal side of the submount, is configured to electrically and mechanically connect the submount to a wiring supplying electrical power to the light source unit;
   a second solder or conductive adhesive, mounted on the second longitudinal side of the light emitting element, is configured to electrically and mechanically connect the light emitting element to the wiring; and
   at least one conductive metal coated through-hole electrically connects a first metallic film positioned on the first longitudinal side of the submount with a second metallic film positioned on the second longitudinal side of the submount.

2. The head gimbal assembly of claim 1,
wherein the flexure comprises the wiring.

3. The head gimbal assembly of claim 1,
wherein the slider comprises the wiring.

4. The head gimbal assembly of claim 1,
wherein the submount further comprises a photodetector integrally formed with the submount.

5. The head gimbal assembly of claim 4,
wherein the photodetector is a semiconductor photodiode.

6. The head gimbal assembly of claim 1, wherein the submount comprises a crystalline silicon material.

7. The head gimbal assembly of claim 6, wherein the submount comprises silicon doped with impurity atoms.

8. A hard disk drive comprising:
a recording disk medium rotatably mounted on a spindle;
a heat assisted magnetic recording head gimbal assembly comprising:
   a light source unit comprising a submount mounted to a light emitting element,
   a suspension comprising a load beam and a flexure movably coupled to the load beam,
   an actuator deformably coupled to the flexure, and
   a slider supported by the suspension, coupled to the flexure and the light source unit, and including a heat assisted magnetic recording head configured to write to and to read from the disk medium, wherein:
   the submount and the light emitting element each have first and second longitudinal sides formed along a longitudinal direction of the assembly, wherein the first longitudinal side of the light emitting element is mounted to the second longitudinal side of the submount, the first longitudinal side of the submount and the second longitudinal side of the light emitting element are opposite sides of the light source unit,
   a first solder or conductive adhesive, mounted on the first longitudinal side of the submount, is configured to electrically and mechanically connect the submount to a wiring supplying electrical power to the light source unit,
   a second solder or conductive adhesive, mounted on the second longitudinal side of the light emitting element, is configured to electrically and mechanically connect the light emitting element to the wiring, and
   at least one conductive metal coated through-hole electrically connects a first metallic film positioned on the first longitudinal side of the submount with a second metallic film positioned on the second longitudinal side of the submount; and
a rotary actuator assembly configured to move the slider to access portions of the disk medium.

9. The hard disk drive of claim 8,
wherein the flexure comprises the wiring.

10. The hard disk drive of claim 8,
wherein the slider comprises the wiring.

11. The hard disk drive of claim 8,
wherein the submount further comprises a photodetector integrally formed with the submount.

12. The hard disk drive of claim 11,
wherein the photodetector is a semiconductor photodiode.

13. The hard disk drive of claim 8, wherein the submount comprises a crystalline silicon material.

14. The hard disk drive of claim 13, wherein the submount comprises silicon doped with impurity atoms.

* * * * *